B. C. SEATON.
WHEEL.
APPLICATION FILED SEPT. 13, 1907.
922,344.
Patented May 18, 1909.
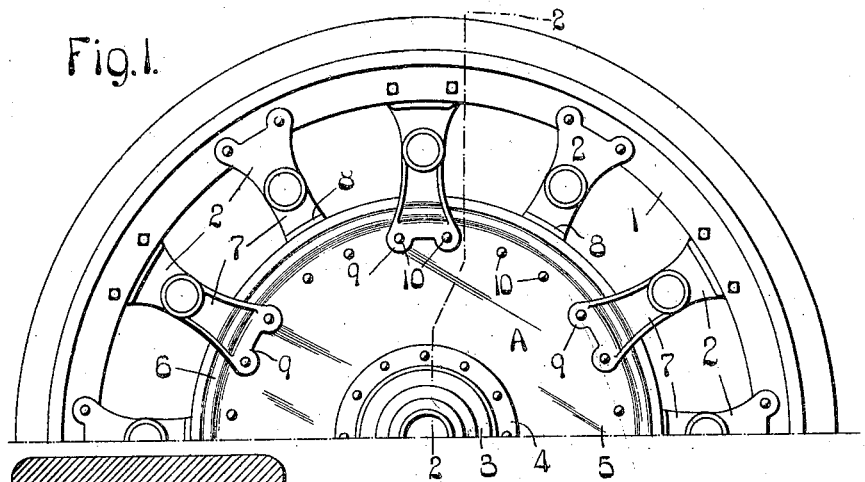
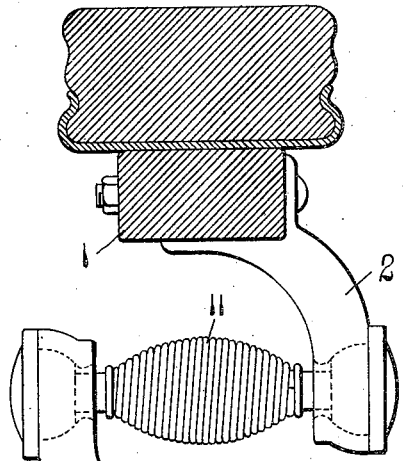
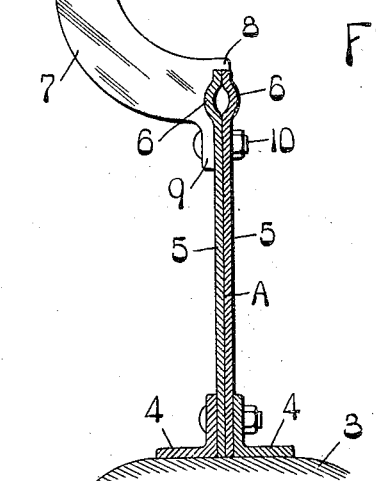
Witnesses
Inventor:
Benjamin C. Seaton
by Bakewell Cornwell
Att'ys.

UNITED STATES PATENT OFFICE.

BENJAMIN C. SEATON, OF DETROIT, MICHIGAN.

WHEEL.

No. 922,344.  Specification of Letters Patent.  Patented May 18, 1909.

Application filed September 13, 1907. Serial No. 392,705.

*To all whom it may concern:*

Be it known that I, BENJAMIN C. SEATON, a citizen of the United States, residing at Detroit, Michigan, have invented a certain new and useful Improvement in Wheels, of which the following is a full, clear, and exact description, such as will enable others skilled in the art to which it appertains to make and use the same, reference being had to the accompanying drawings, forming part of this specification, in which,—

Figure 1 is a side elevation of a portion of a wheel embodying the features of my invention; and Fig. 2 is an enlarged sectional view taken on the line 2—2 of Fig. 1.

This invention relates to wheels of the type shown in my prior patent No. 814,737, dated March 13, 1906. The wheel shown in said patent comprises a hub section consisting of a hub, spokes and a felly secured to the spokes, an outer tread-carrying rim of greater diameter than the felly of the hub section, and transversely arranged tension springs connected to the felly of the hub section and to the outer tread-carrying rim in such a manner that the tension of the springs will be equally distributed circumferentially around the wheel.

The object of the invention herein described is to provide a wheel of the general type above referred to but in which the hub section consists of a hub and a metal disk or circular plate arranged at the center of the hub and provided with laterally projecting arms to which transversely extending tension springs are secured, said arms being so disposed that alternate arms project laterally in opposite directions. The tread-carrying rim is provided with inwardly projecting arms which are so arranged that they are disposed oppositely to the arms on the hub section and the tension springs are interposed between and are connected to these pairs of arms so that the tension of the springs will be equally distributed circumferentially around the wheel.

Referring to Figs. 1 and 2 of the drawings which illustrate the preferred form of my invention, 1 designates a tread-carrying rim which has inwardly projecting arms 2 secured thereto, said arms being arranged alternately adjacent the opposite side edges of the rim 1 and projecting laterally in opposite directions out of the vertical plane in which the rim lies. The hub 3 has a pair of flanged rings 4 secured to the central portion thereof, and a metal disk A is arranged between the vertical flanges of said rings and is secured thereto by fastening devices. I have herein shown said disk as consisting of a pair of metal plates 5 each of which is provided adjacent its outer edge with a pressed rib 6 which extends circumferentially around the plate for the purpose of stiffening the plate and also to serve as a means for preventing the arms hereinafter described from twisting or moving relatively to the plate. It will be obvious, however, that the central supporting member could be formed in numerous other ways without departing from the spirit of my invention. Laterally projecting arms 7 are secured to the disk A adjacent the outer edge thereof, alternate arms projecting laterally in opposite directions from the disk and being disposed oppositely to the arms 2 on the tread-carrying rim 1. The arms 2 and also the arms 7 are preferably formed of cast metal and each of the arms 7 is provided with a groove for receiving the rib 6 on the plate 5 against which the arm lies so as to prevent the arm from twisting or turning relatively to the disk. The arm is provided with a lug 8 which rests on the periphery of the disk, and on the underneath side of the arm is a flange 9 through which a fastening device 10 passes for securing the arm to the disk. The transversely extending tension springs 11 are interposed between the arms on the disk and the arms on the rim, as shown in Fig. 2, and are secured thereto in any suitable manner.

While I prefer to form the arms 2 and 7 of cast metal it will, of course, be understood that they could be formed of pressed metal.

Having thus described my invention, what I claim as new and desire to secure by Letters Patent is:

1. A wheel comprising a hub, a metal disk secured to the central portion of said hub and provided adjacent its periphery with ribs, laterally projecting arms arranged alternately on opposite sides of said disk and provided with recesses for receiving said ribs, fastening devices for securing said arms to said disk, an outer rim provided with inwardly extending arms that are arranged oppositely to the arms on the disk, and transversely extending tension springs arranged between and connected to the arms on the disk and the arms on the rim; substantially as described.

2. A wheel comprising a hub, circular plates secured to the central portion of said hub to form a supporting disk, laterally projecting arms arranged alternately on opposite sides of said disk adjacent the periphery thereof, each of said arms being provided with a lug which engages the peripheral edge of the disk, fastening devices passing through said arms and disk to retain the arms in position, a tread-carrying rim, inwardly projecting metal arms arranged alternately adjacent the opposite side edges of said rim and disposed oppositely to the arms on the disk, and coiled tension springs interposed between and connected to the arms on the disk and the arms on the rim; substantially as described.

In testimony whereof I hereunto affix my signature in the presence of two witnesses, this tenth day of September 1907.

BENJAMIN C. SEATON.

Witnesses:
WELLS L. CHURCH,
GEORGE BAKEWELL.